US005519183A

United States Patent [19]

Mueller

[11] Patent Number: 5,519,183

[45] Date of Patent: May 21, 1996

[54] PLASMA SPRAY GUN HEAD

[75] Inventor: Markus Mueller, Dintikon, Switzerland

[73] Assignee: Plasma-Technik AG, Wohlen, Switzerland

[21] Appl. No.: 304,132

[22] Filed: Sep. 12, 1994

[30] Foreign Application Priority Data

Sep. 29, 1993 [DE] Germany .......................... 43 33 068.1

[51] Int. Cl.[6] .................................................... B23K 10/00

[52] U.S. Cl. ................................ 219/121.52; 219/121.49; 219/121.48; 219/76.16; 219/121.47

[58] Field of Search ......................... 219/121.49, 121.51, 219/121.52, 75, 121.48, 76.16, 121.47

[56] References Cited

U.S. PATENT DOCUMENTS

| | | | |
|---|---|---|---|
| 3,851,140 | 11/1974 | Coucher | 219/121.52 |
| 4,121,082 | 10/1978 | Harrington et al. | 219/76.16 |
| 4,423,304 | 12/1983 | Bass et al. | 219/121.48 |
| 4,661,682 | 4/1987 | Gruner et al. | 219/121.47 |
| 4,843,208 | 6/1989 | French et al. | 219/121.39 |
| 4,877,937 | 10/1989 | Muller | 219/121.59 |

*Primary Examiner*—Mark H. Paschall
*Attorney, Agent, or Firm*—Tarolli, Sundheim, Covell, Tummino & Szabo

[57] ABSTRACT

The plasma gun head for plasma spraying apparatuses essentially comprises a cathode body mender, an anode body member and an insulating member inserted there between and electrically insulating these two members from each other. Inserted into the cathode body member is a cathode assembly, and into the anode body member an anode nozzle, both extending transverse to the longitudinal axis of the plasma gun head. The anode body member and the cathode body member both are provided with cooling channel sections which are connected in series as seen in the direction of flow of the cooling medium. The anode nozzle is rigidly integrated into the anode body member; thus, it is not necessary to provide sealing elements in this thermally highly stressed region. The sealing elements required for sealing the cooling channel sections are located remote from the anode nozzle and the cathode assembly, respectively, in a region, which is thermally not stressed.

19 Claims, 1 Drawing Sheet

PLASMA SPRAY GUN HEAD

FIELD OF THE INVENTION

The present invention refers to a plasma gun head adapted to be used in a plasma spraying apparatus, comprising a cathode body member, an anode body member and an insulating body member located between the cathode body member and the anode body member and electrically insulating the cathode and anode body members from each other. The cathode body member comprises a cathode assembly and the anode body member comprises an anode nozzle, both the cathode assembly and the anode nozzle extending in a direction perpendicular to the longitudinal central axis of the plasma gun head.

The cathode body member and the anode body member are provided with cooling channel sections adapted to receive a liquid cooling medium and forming a circular channel in the region of the anode nozzle such that the liquid cooling medium flows around the anode nozzle, whereby sealing members are provided for sealing the cooling channel sections.

A plasma gun head of the kind referred to here above is preferably used for the coating of the inner walls of cavities, e.g. tube walls, bore walls, channel walls and the like. In order to be in a position to coat also shoulders and angled portions present on inner walls of cavities and in order to ensure an even and homogenous thickness of the applied coating material, it has proven advantageous to arrange the electrode of the plasma gun head, consisting of the anode nozzle and the cathode, crosswise to the longitudinal extension of the plasma gun head; consequently, the central longitudinal axis of the plasma torch generated by the plasma gun head extends perpendicular to the central longitudinal axis of the plasma gun head. In order to avoid an overheating of the plasma gun head during the coating operation, the plasma gun head must by provided with a cooling system, in most cases a liquid cooling system.

PRIOR ART

European Patent Nr. 0,171,793 discloses a plasma gun head which shows the afore mentioned constructional characteristics. This plasma gun head comprises a cathode semi-shell and a anode semi-shell. The two semi-shells are separated from each other by an insulating plate. Inserted into the cathode semi-shell is a cathode assembly designated as electrode, and into the anode semi-shell is inserted a burner nozzle. Both the electrode and the burner nozzle are said to be easily replaceable. In order to cool the burner nozzle, there is provided a cooling channel incorporating an annular channel section surrounding the burner nozzle. The sealing of the annular channel section with regard to the inserted burner nozzle is accomplished by means of two O-ring sealing members. In order to cool these two O-ring sealing members, additional cooling channels are provided which lead to these O-ring sealing members. In order to cool the cathode semi-shell with the cathode assembly inserted therein, there is provided a further cooling channel which takes the shape of an annular channel section in the region of the cathode assembly. However, the annular channel section is not led directly to the cathode assembly.

By means of such a burner head, coating tasks can be executed in which it is ensured that the heat created by the burner head during the coating operation is led away quickly and efficiently. In order to ensure an efficient heat removal, it is important that the air surrounding the burner head can freely circulate. Of further importance is that also the substrate to be coated can lead away the induced heat in order to avoid that the burner head is additionally heated up by the heat radiation created by the substrate.

However, if the inner walls of tubes or channels with a relatively small inner diameter have to be coated, the heat created by the coating operation is taken away but slowly and inefficiently with the result that the burner head is heated up to a great extent. Such a heating up of the burner head even can take place to such a degree that the burner head is damaged. Quite often such a damage of the burner head results in a total destruction of the burner head. An exhaustive analysis of such cases has shown that the reason for the destruction or damage of the burner head is to find in the O-ring sealing members since these elements are not able to bear a high thermal load during a prolonged period of time.

The reason therefor probably can be found in the fact that the O-ring sealing members fit closely and directly contact the burner nozzle. Even if the O-ring sealing members are cooled by the cooling medium at one side thereof, nevertheless the danger exists that they begin to melt or that their properties and characteristics are changed to such an extent under the influence of the hot burner nozzle that no longer a reliable sealing of the circular cooling channel section surrounding the burner nozzle is ensured. Even the least escape of cooling medium into the region of the burner nozzle, however, results in a serious damage or destruction of the plasma gun head.

The danger that the O-ring sealing members and, thereby, the plasma gun head are damaged increases with the duration of operation of the plasma gun head, particularly in the case if the inner walls of tubes, channels and the like having a small diameter are to be coated because, in this case, the heat is but inefficiently taken away.

Thus, such a plasma gun head known in the art is suitable only for operation during a strictly limited period of time when the inner walls of small tubes, channels and so on have to be coated.

A further disadvantage of a plasma gun head known in the art is that such a device can be used only for moderate coating performance. If the coating performance, i.e. deposit of coating material per time unit, is increased, the plasma gun head known in the art heats up even more quickly with the result that the O-ring sealing members are destroyed already after a very short operation period. However, in order to be in a position to effect coating operations more efficiently and at lower costs, it would be desirable, on the one hand, that the uninterrupted operating period of the plasma gun head could be prolonged and, on the other hand, that the coating performance could be increased.

In order to achieve a coating with a quality as even as possible, it is often required that the coating operation should not be interrupted if a series of work pieces has to be coated in the same manner. Thereby, it may happen that a plasma gun is under continuous operation for up to several days. In order to be able to bear such heavy duty operation, it is necessary for the plasma gun head that its cooling is optimized and improved. With the plasma gun heads known in the art, its is not possible to maintain a coating operation during such extended periods, particularly if the inner walls of tubes, channels and the like having a small diameter have to be coated.

OBJECTS OF THE INVENTION

It is an object of the invention to provide a plasma gun head which is particularly suitable for the coating of the inner walls of small tubes, channels an the like which has an improved cooling and, consequently, can be operated during extended periods of time.

It is a further object of the invention to provide a plasma gun head which is particularly suitable for the coating of the inner walls of small tubes, channels an the like by means of which a higher coating performance (deposit of coating material per time unit) can be achieved.

It is a still further object of the invention to provide a plasma gun head which is particularly suitable for the coating of the inner walls of small tubes, channels an the like which has very small physical dimensions and nevertheless can be operated during extended periods of time with a high coating performance.

SUMMARY OF THE INVENTION

To meet these and other objects, the invention provides a plasma gun head adapted to be used in a plasma spraying apparatus, comprising a cathode body member, an anode body member and an insulating body member located between the cathode body member and the anode body member and electrically insulating the cathode and anode body members from each other.

The cathode body member is provided with a cathode assembly and the anode body member is provided with an anode nozzle. Both the cathode assembly and the anode nozzle extend in a direction perpendicular to the longitudinal central axis of the plasma gun head.

The cathode body member and the anode body member are provided with cooling channel sections adapted to receive a liquid cooling medium and forming a circular channel in the region of the anode nozzle such that the liquid cooling medium flows around the anode nozzle means.

Sealing elements serve for sealing the cooling channel sections. The sealing elements are located in a transition region of the cooling channel sections between the cathode member and the insulating members as well as in a transition region of the cooling channel sections between the insulating member and the anode member and at a distance to the cathode assembly and the anode nozzle, respectively.

The cooling channel sections in the anode body member and the cooling channel sections in the cathode body member are connected in series with reference to the direction of flow of the liquid cooling medium. The anode nozzle of the plasma gun head according to the invention is rigidly connected to the anode body member without the use of any sealing elements.

Such a plasma gun head renders possible for the first time that no sealing means whatsoever are required in the region of the anode nozzle of the plasma gun head to seal the cooling channel section leading to the anode nozzle. Thus, the sealing elements provided up to now in this region, which are subjected to a very high wear particularly in the case of compact plasma gun heads, in the case of high coating performance and in the case of operation of the plasma gun head over extended periods of time, can be completely avoided. The sealing elements required for sealing the cooling channel sections can be located in a region of the plasma gun head which is not under a high thermal stress. Due to the fact that the cooling channel sections are connected in series as seen in the direction of flow of the cooling medium, it is rendered possible to provide cooling channels with a higher cross sectional area within the available total cross sectional area of the plasma gun head; thereby, the cooling efficiency is remarkably improved.

According to a preferred embodiment of the plasma gun head according to the invention, the cathode assembly is inserted into a cathode socket member provided on the cathode body member such as to be releasable from within the interior of the cathode body member, whereby the cooling channel section running through the cathode body member runs past the back side of the cathode assembly. In this way, it is possible that the cooling channel section in the region of the cathode assembly must not be designed as a circular channel section. Thus, the cooling channel section may have a greater cross sectional area with the result that the flow resistance is lower and the cooling efficiency improved. Moreover, by such a design, it is possible to avoid the provision of sealing elements in the region of the cathode assembly, in contrary to most plasma gun heads known in the art.

To sum up, such a plasma gun head has a much more efficient cooling than comparable plasma gun heads known in the art; thus, it is suitable to be used under heavy duty condition during extended periods of time even under unfavorable thermal conditions.

According to a further preferred embodiment, the insulating body member is provided with longitudinal bores running along its both lateral side faces, and with a plurality of transverse bores leading to the exterior of the insulating body member. These bores serve for supplying a gaseous medium, e.g. air, by means of which the plasma gun head itself is further cooled and which can moreover be used to cool the applied coating and/or the substrate to be coated.

According to a still further preferred embodiment, the anode body member is provided with longitudinal bores running along its both lateral side faces, and with a plurality of transverse bores leading to the exterior of the insulating body member. These bores serve, as already explained in connection with the embodiment just discussed here above, for supplying a gaseous medium, e.g. air, by means of which the plasma gun head itself is further cooled and which can moreover be used to cool the applied coating and/or the substrate to be coated.

The plasma gun head according to the invention may have an essentially trapezoidal cross section. Such shaping allows that cooling channels with a greater cross section can be provided in the interior of the plasma gun head than in a plasma gun head having circular cross section and having the same cross sectional area. On the other hand, this design allows to realize a more optimal spraying distance between the anode body member and the substrate to be coated.

BRIEF DESCRIPTION OF THE DRAWINGS

In the following, an embodiment of the plasma gun head according to the invention will be further described, with reference to the accompanying drawings, in which.

DETAILED DESCRIPTION OF A PREFERRED EMBODIMENT

Figure 2:
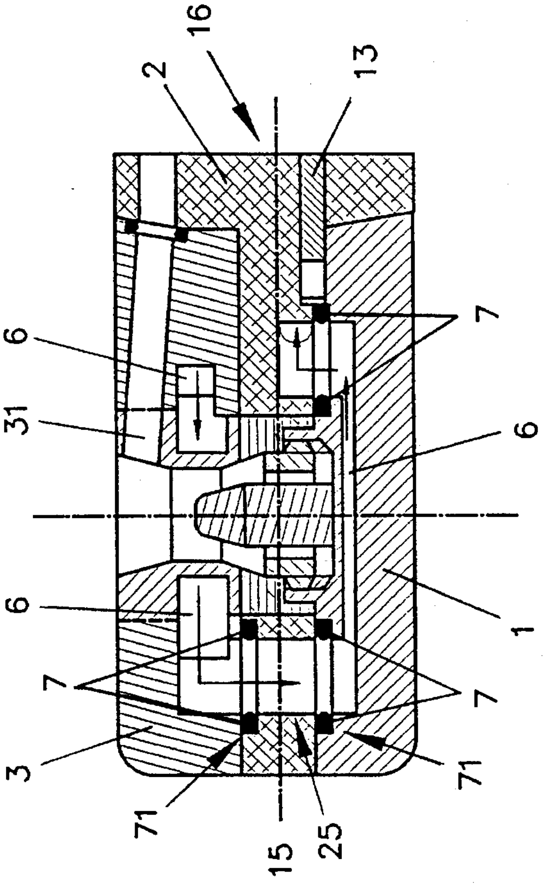
FIG. 2 shows a longitudinal sectional view of the plasma gun head.
Figure 1:
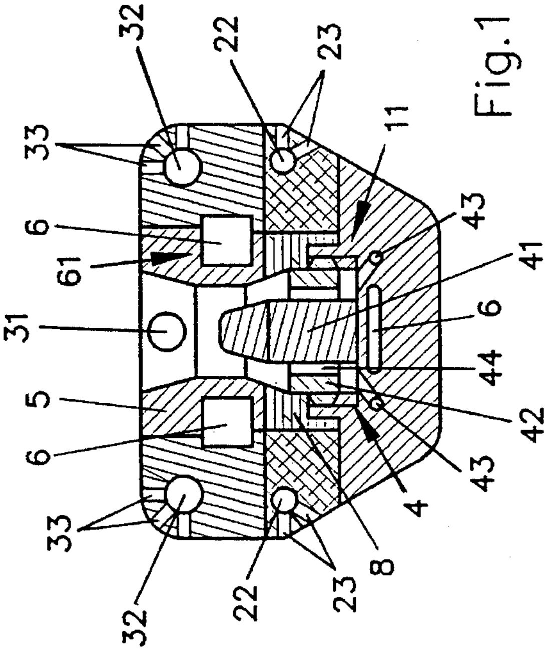
FIG. 1 shows a cross sectional view of the plasma gun head.

In FIGS. 1 and 2, the plasma gun head is shown in a cross sectional and in a longitudinal sectional view. Since the general design of such a plasma gun head to be further discussed here is known per se in the art, in the following, only the parts and elements of the plasma gun head shown here which are essential for the invention will be explained in detail. These parts and elements are a cathode body member 1, an anode body member 3 and an insulating body member 2 as well as a cathode assembly 4 and an anode nozzle 5. The cathode body member 1, the anode body member 3 and the insulating body member 2 are connected to each other along connecting planes which run parallel to each other and parallel to a central longitudinal axis 15 of the plasma gun head. The insulating body member 2 located between the cathode body member 1 and the anode body member 3 insulates the afore mentioned members 1 and 3 from each other.

The insulating body member 2 is provided with a flange member 21 on its front end face 16 where all the supply lines, conductors and pipes required for the operation of the plasma gun head are located. The flange member 21 covers the front end faces of the cathode body member 1 and of the anode body member 3. In FIG. 2, an electric supply conductor 13 can be seen which is inserted into the insulating body member 2 and which serves to supply electric power to the cathode body member 1. All supply lines, pipes, channels and electric conductors required for the operation of the plasma gun head penetrate the flange 21 of the insulating body member 2 which is provided, for this purpose, with corresponding break-outs. In the drawings, these break-outs are not shown for the sake of clarity.

The cathode body member 1 is provided with a cathode socket member 11 accessible from within the inner side of the cathode base member 1. The socket member 11 is designed as a screw socket adapted to receive the cathode assembly 4 consisting of the real cathode member 41 and a circular gas distribution member 42. The anode nozzle 5 is firmly inserted into the anode body member without the use of any sealing elements. The fixing of the anode nozzle 5 can be accomplished by pressing in or preferably by brazing. Moreover, there is provided a circular insulating member 8 consisting preferably of ceramic material which surrounds the cathode assembly 4 and which insulates the latter not only electrically, but also thermally.

In order to cool the plasma gun head, there is provided a cooling channel consisting of a plurality of cooling channel sections 6 which opens at the front end 16 into the insulating body member 2. In the interior of the insulating body member 2, the cooling channel section 6 is turned by 90° to the anode body member. Thereafter, it runs past the anode nozzle 5 whereby it takes the form of a circular cooling channel 61. Now, the cooling channel section 6 is turned by 90° again and opens into the cathode body member 1 via a break-out 25 in the insulating body member 2 in the interior of which it is turned by 90° still again. In the interior of the cathode body member 1, the cooling channel section 6 runs past the back side of the cathode assembly 4 and opens, after having been turned by 90° still again, into the insulating body member 2 from which it is led out at the front end face of the insulating body member 2. Such a series arrangement of the cooling channel sections 6 provided in the cathode body member 1, the insulating member 2 and the anode body member 3 ensures that the cross section of the cooling channel is greater than the one in a parallel arrangement of the cooling channels known in the art.

The plasma gas required for the operation of the plasma gun head is supplied through two gas channels 43. These gas channels 43 open at the front end face of the cathode body member 1 and run laterally through the cathode body member 1 to the cathode socket 11. From the cathode socket 11, the plasma gas is conducted, through bores 44 provided in the circular gas distribution member 42, to the front of the cathode assembly and, thereby, into the region of the plasma torch to be generated. The supply of coating material is accomplished through a bore 31 which is provided in the front end face of the anode body member 3. The bore 31 runs through the anode body member 3 and opens, essentially radially, into the anode nozzle member 5.

As the anode nozzle member 5 is pressed or brazed into the anode body member 3, it is not necessary to seal the cooling channel, running in the shape of an annular channel 61 around the anode nozzle member 5, with regard to the anode nozzle member 5. Thus, any sealing members in this thermally highly loaded region, usually in the shape of O-rings, can be avoided. In order to seal the separate series connected cooling channel sections 6, there are provided O-ring sealing members 7 in the transition region from the cathode body member 1 to the insulating body member 2 and in the transition region from the insulating body member 2 to the anode body member 3. For receiving these O-ring sealing members 7, the cathode body member 1 and the insulating body member 2 are provided with recesses 71 corresponding in shape to the O-ring sealing members 7.

Additionally, the insulating body member 2 is provided with two longitudinally running bores 22 which open into the front end face of the insulating body member 2 and run through the interior thereof along its longitudinal lateral sides to its end region. Along the extension of these longitudinal bores 22, a plurality of transverse bores 23 run from the afore mentioned bores 22 radially to the outside of the insulating body member 2.

The anode body member 3 is also provided with two longitudinally running bores 32 which open into the front end face of the anode body member 3 and run through the interior thereof along its longitudinal lateral sides to its end region. Again, along the extension of these longitudinal bores 32, a plurality of transverse bores 33 run from the afore mentioned bores 32 radially to the outside of the anode body member 3.

The transverse bores 33 provided in the anode body member 3 and leading to the outside thereof are arranged in three groups. As seen in longitudinal direction of the plasma gun head, the transverse channels 33 of each of these three groups leads to the outside of the anode body member under a different angle. The same is true for the transverse bores 23 provided in the insulating body member 2, whereby in this case only two groups of transverse bores 23 are provided.

By means of the afore mentioned transverse bores 23 and 33, respectively, the insulating body member 2 and the anode body member 3, respectively, can be additionally cooled. On the other hand, by means of the afore mentioned transverse bores 23 and 33, respectively, the substrate region and/or the coating surrounding the plasma gun head can be cooled. If the coating operation takes place in an inert gas atmosphere, preferably argon is used as a cooling gas, while in the case of a coating operation under atmospheric conditions, air can be used as a cooling gas.

As can be seen in FIG. 2, the plasma gun head has an oblate shape at its top and bottom. By this oblete design, on the one hand, it is ensured that cooling channels with a greater cross section can be provided in the interior of the plasma gun head than in a plasma gun head having circular cross section and having the same cross sectional area. On the other hand, this design allows to realize a more optimal spraying distance between the anode body member and the substrate to be coated.

Figure 3:
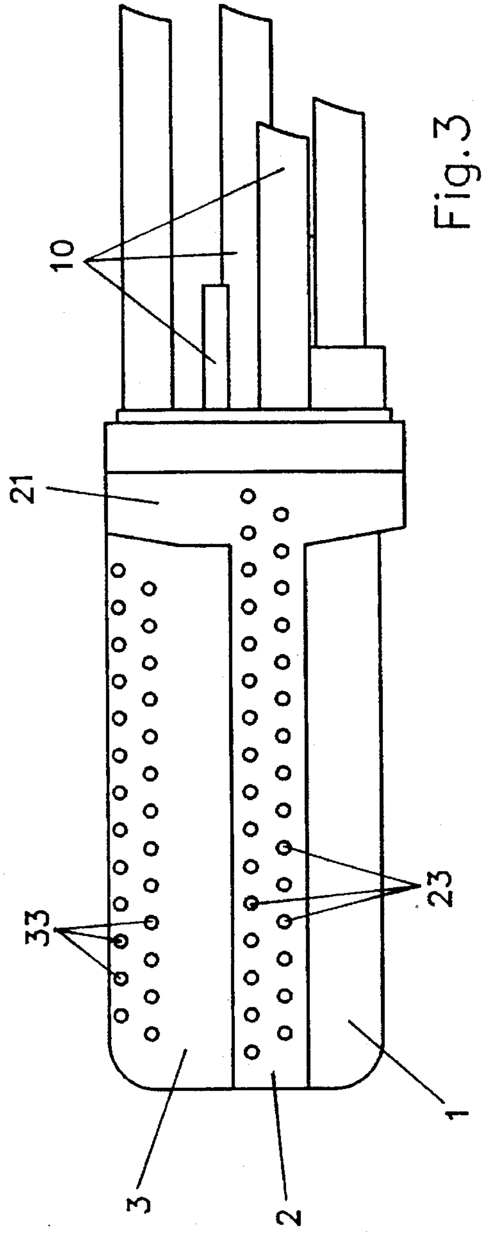
FIG. 3 shows an external view of the plasma gun head.

FIG. 3 shows the plasma gun head in a lateral view. In this figure, the afore mentioned transverse bores 23 provided in the insulating body member 2 and leading from the longitudinal channel provided in the interior thereof to the outside as well as the afore mentioned transverse bores 33 provided in the anode body member 3 and leading from the longitudinal channel provided in the interior thereof to the outside can be clearly seen. Moreover, FIG. 3 shows a number of supply pipes and conductors 10 required for the operation of the plasma gun head. Depending on the setting of the task, it is possible to adapt the number of the transverse bores 23 and 33 as well as the exit angles thereof out of the insulating body member 2 and the anode body member 3, respectively, to the required cooling performance. Moreover, the amount per time unit of cooling gas or cooling air escaping from these transverse bores 23 and 33 can be varied within certain limits to thereby vary the cooling performance.

To sum up, it can be stated that, with the help of a plasma gun head designed according to the invention, a higher coating performance over a longer period of time can be achieved as compared to similar plasma gun heads known in the art. The main reasons are that the sealing members, particularly the sensitive O-ring sealing members 7, are located in the interior of the plasma gun head far away from the zone which is thermally highest loaded, and that the cooling performance of the plasma gun head according to the invention is much improved and optimized as compared to plasma gun heads known in the art. Thus, with the help of such a plasma gun head as provided by the invention, even cavities and the walls of bores, channels etc. can be coated which have a comparatively small diameter. Such coating was not possible up to know since the heat generated during the coating operation could not be drawn off very efficiently in the case of narrow cavities, small bores and channels etc. with the result that the plasma gun heads known in the art have heated up to such an extent that the O-ring sealing members have been destroyed and lost their sealing function. Thereby, the plasma gun heads known in the art have been damaged after a short operation period or even have been fully destroyed.

As the entire anode body member 3 together with the integrated anode nozzle member 5 can be designed as a component subject to wear, it is not necessary to design the plasma powder pipe 31 as a separately exchangeable module. If required, just the entire anode body member 3 is exchanged.

The anode nozzle member 5 preferably consists of a copper alloy, whereby it is also possible to use tungsten. The cathode body member 1 and the anode body member 3 preferably are made of brass since brass, on the one hand, has a good conductivity of electric current and, on the other hand, can be easily machined.

What is claimed is:

1. A plasma gun head adapted to be used in a plasma spraying apparatus, comprising:

a cathode body member;

an anode body member;

an insulating body member located between said cathode body member and said anode body member and electrically insulating said cathode and anode body members from each other;

said cathode body member comprising a cathode assembly means and said anode body member comprising an anode nozzle means, both said cathode assembly means and said anode nozzle means extending in a direction perpendicular to a longitudinal central axis of said plasma gun head;

said cathode body member and said anode body member being provided with cooling channel sections adapted to receive a liquid cooling medium and forming a circular channel in the region of said anode nozzle means such that said liquid cooling medium flows around said anode nozzle means;

sealing means for sealing said cooling channel sections;

said cooling channel sections in said anode body member and said cooling channel sections in said cathode body member being connected in series with reference to the direction of flow of said liquid cooling medium;

said anode nozzle means being rigidly connected to said anode body member; and said sealing means being located in a transition region of said cooling channel sections between said cathode member and said insulating members as well as in a transition region of said cooling channel sections between said insulating member and said anode member and at a distance to said cathode assembly means and said anode nozzle means, respectively.

2. A plasma gun head according to claim 1 in which said cathode assembly is inserted into a cathode socket member provided on said cathode body member such as to be releasable from within the interior of said cathode body member, whereby said cooling channel section running through said cathode body member runs past the back side of said cathode assembly such that the cooling medium flows around the back side of said cathode assembly without the cooling medium being in direct contact with said cathode assembly.

3. A plasma gun head according to claim 1 in which said insulating body member is provided with longitudinal bores running along its both lateral side faces, and with a plurality of transverse bores leading to the exterior of said insulating body member, whereby the central axes of said transverse bores run in radial direction with reference to said longitudinal bores.

4. A plasma gun head according to claim 1 in which said anode body member is provided with longitudinal bores running along its both lateral side faces, and with a plurality of transverse bores leading to the exterior of said anode body member, whereby the central axes of said transverse bores run in radial direction with reference to said longitudinal bores.

5. A plasma gun head according to claim 3 in which a part of said transverse bores leading to the exterior extend in different angles from said longitudinal bores to the exterior of said insulating body member and said anode body member, respectively, as seen in longitudinal direction of the plasma gun head.

6. A plasma gun head according to claim 1 in which said cathode body member is additionally provided with at least one gas channel means which starts at the front face of said cathode body member, runs laterally through said cathode body member up to the region of said cathode socket member and opens into the back side of said cathode socket member.

7. A plasma gun head according to claim 6 in which said cathode assembly comprises a socket member and a cathode pin member inserted therein, said socket member being designed as a circular gas distribution member having a plurality of bores which run essentially parallel to the central longitudinal axis of said cathode pin member, such that a gaseous medium is led through said gas channel means and said plurality of bores to the front side of said cathode assembly upon insertion of said cathode assembly into said cathode body member.

8. A plasma gun head according to claim 1 in which there is provided a plasma powder conduit for feeding plasma powder to the plasma gun head, said plasma powder conduit being designed as a bore running within said anode body member and opening into said anode nozzle member in essentially radial direction.

9. A plasma gun head according to claim 1 in which said cathode body member, said anode body member and said insulating body member are connected to each other along connection planes running parallel to the central longitudinal axis of the plasma gun head, whereby said cooling channel sections provided in said cathode body member and said anode body member, respectively, run in perpendicular direction to said connection planes in the region of their inlets and outlets.

10. A plasma gun head according to claim 1 in which said insulating body member is provided, at its one end face, with a integrally formed flange member running essentially perpendicularly to said connection planes and covering the facing end face of said cathode body member and said anode body member.

11. A plasma gun head according to claim 10 in which the inlet and the outlet of the cooling channel formed by said cooling channel sections are led into said insulating body member via an end sided bore in said flange member of said insulating body member and are turned by 90° in the interior of said insulating body member such that their position corresponds, after having been turned by 90°, to the position of the inlet and outlet of the cooling channel sections provided in said anode body member and said cathode body member.

12. A plasma gun head according to claim 10 in which all supply pipes and conduits, channels and electrical connections required for the operation of the plasma gun head are led through said flange member.

13. A plasma gun head according to claim 1 in which the plasma gun head is of oblate shape as seen in a cross sectional view.

14. A plasma gun head according to claim 13 in which the plasma gun head has an essentially trapezoidal shape, as seen in a cross sectional view.

15. A plasma gun head according to claim 4 in which a part of said transverse bores leading to the exterior extend in different angles from said longitudinal bores to the exterior of said insulating body member and said anode body member, respectively, as seen in longitudinal direction of the plasma gun head.

16. A plasma gun head adapted to be used in a plasma spraying apparatus, comprising:

a cathode body member;

an anode body member;

an insulating body member located between said cathode body member and said anode body member and electrically insulating said cathode and anode body members from each other;

said cathode body member comprising a cathode assembly means and said anode body member comprising an anode nozzle means, both said cathode assembly means and said anode nozzle means extending in a direction perpendicular to a longitudinal central axis of said plasma gun head;

said cathode body member and said anode body member being provided with cooling channel sections adapted to receive a liquid cooling medium and forming a circular channel in the region of said anode nozzle means such that said liquid cooling medium flows around said anode nozzle means;

sealing means for sealing said cooling channel sections;

said cooling channel sections in said anode body member and cooling channel sections in said cathode body member being connected in series with reference to the direction of flow of said liquid cooling medium;

said anode nozzle means being rigidly connected to said anode body member;

said sealing means being located in a transition region of said cooling channel sections between said cathode member and said insulating member as well as in a transition region of said cooling channel sections between said insulating member and said anode member and at a distance to said cathode assembly means and said anode nozzle means, respectively; and said insulating body member is provided with longitudinal bores running along both its lateral side faces, and with a plurality of transverse bores leading to the exterior of said insulating body member, whereby respective central axes of said transverse bores run in radial direction with reference to said longitudinal bores.

17. A plasma gun head according to claim 16 in which a part of said transverse bores leading to the exterior extend in different angles from said longitudinal bores to the exterior of said insulating body member and said anode body member, respectively, as seen in longitudinal direction of the plasma gun head.

18. A plasma gun head adapted to be used in a plasma spraying apparatus, comprising:

a cathode body member;

an anode body member;

an insulating body member located between said cathode body member and said anode body member and electrically insulating said cathode and anode body members from each other;

said cathode body member comprising a cathode assembly means and said anode body member comprising an anode nozzle means, both said cathode assembly means and said anode nozzle means extending in a direction perpendicular to a longitudinal central axis of said plasma gun head;

said cathode body member and said anode body member being provided with cooling channel sections adapted to receive a liquid cooling medium and forming a circular channel in the region of said anode nozzle means such that said liquid cooling medium flows around said anode nozzle means;

sealing means for sealing said cooling channel sections;

said cooling channel sections in said anode body member and cooling channel sections in said cathode body member being connected in series with reference to the direction of flow of said liquid cooling medium;

said anode nozzle means being rigidly connected to said anode body member;

said sealing means being located in a transition region of said cooling channel sections between said cathode member and said insulating member as well as in a transition region of said cooling channel sections between said insulating member and said anode member and at a distance to said cathode assembly means and said anode nozzle means, respectively; and said anode body member is provided with longitudinal bores running along both its lateral side faces, and with a plurality of transverse bores leading to the exterior of said insulating body member, whereby respective central axes of said transverse bores run in radial direction with reference to said longitudinal bores.

19. A plasma gun head according to claim 18 in which a part of said transverse bores leading to the exterior extend in different angles from said longitudinal bores to the exterior of said insulating body member and said anode body member, respectively, as seen in longitudinal direction of the plasma gun head.

* * * * *